(12) United States Patent (10) Patent No.: US 12,578,029 B2

Kesler et al. (45) Date of Patent: Mar. 17, 2026

(54) VALVE ASSEMBLY FOR A FLUID SYSTEM

(71) Applicant: Hanon Systems, Daejeon (KR)

(72) Inventors: Eric Kesler, Northville, MI (US); Patty Flynn, El Paso, TX (US); Daniel Ratkos, Warren, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/505,539

(22) Filed: Nov. 9, 2023

(65) Prior Publication Data

US 2025/0155042 A1 May 15, 2025

(51) Int. Cl.
| | |
|---|---|
| *F16K 27/02* | (2006.01) |
| *F16K 1/38* | (2006.01) |
| *F16K 1/42* | (2006.01) |

(52) U.S. Cl.
CPC ............ *F16K 27/0254* (2013.01); *F16K 1/38* (2013.01); *F16K 1/42* (2013.01)

(58) Field of Classification Search
CPC .......... F16K 27/0254; F16K 1/38; F16K 1/42
See application file for complete search history.

(56) References Cited

U.S. PATENT DOCUMENTS

| | | | | |
|---|---|---|---|---|
| 2,904,877 A | * | 9/1959 | Edelen | F16K 1/38 |
| | | | | 29/527.4 |
| 4,644,972 A | * | 2/1987 | Perrott | F16K 15/182 |
| | | | | 137/543.13 |
| 4,644,973 A | * | 2/1987 | Itoh | F25B 41/40 |
| | | | | 137/883 |
| 6,035,893 A | * | 3/2000 | Ohmi | F16K 27/003 |
| | | | | 137/884 |
| 6,266,971 B1 | | 7/2001 | Schroder et al. | |
| 7,370,673 B2 | * | 5/2008 | Trumbower | F25B 45/00 |
| | | | | 251/340 |
| 7,681,596 B2 | * | 3/2010 | Reck | F16K 11/22 |
| | | | | 137/883 |
| 8,925,176 B2 | * | 1/2015 | Choi | F25B 41/40 |
| | | | | 29/469 |
| 2008/0314466 A1 | * | 12/2008 | Cimberio | F16K 11/20 |
| | | | | 137/883 |
| 2014/0299198 A1 | * | 10/2014 | Diehl | F16L 41/023 |
| | | | | 137/15.01 |
| 2018/0363642 A1 | * | 12/2018 | Salih | F04B 53/1027 |

FOREIGN PATENT DOCUMENTS

| | | | |
|---|---|---|---|
| KR | 200224523 Y1 | 5/2001 | |

* cited by examiner

*Primary Examiner* — Patrick C Williams
(74) *Attorney, Agent, or Firm* — Shumaker, Loop & Kendrick, LLP; James D. Miller

(57) ABSTRACT

A valve assembly for a fluid system is disclosed. The valve assembly includes a housing having a base portion and a stem portion. A valve core is disposed in a cavity formed in the stem portion. The valve core is in fluid communication with a port formed in a component of the fluid system through passageways and the cavity of the base portion. The valve assembly further includes a valve disposed in a cavity formed in the base portion. The valve is configured to selectively permit a flow of fluid through at least one of the passageways, and thereby the valve assembly. The valve is configured to provide hermetic sealing to selectively isolate the valve core from the component of the fluid system.

20 Claims, 11 Drawing Sheets

VALVE ASSEMBLY FOR A FLUID SYSTEM

FIELD

The disclosure relates to a fluid system, and more particularly to a valve assembly for a fluid system.

BACKGROUND

Vehicle heat exchangers, such as radiators, condensers, chillers, etc., include valves, which are used to control the rate that a fluid such as coolant and refrigerant, for example, is allowed to flow through the system. With the increase in government mandated fuel economy regulations, companies are increasingly looking for new technology that will reduce the parasitic losses and improve efficiency of internal combustion engines. Furthermore, the introduction of hybrid and fully electric vehicle powertrains has introduced powertrain and thermal management complexities due to the need to control the temperature of batteries, inverter electronics, electric motors, etc. These trends lead to the need for more intelligently controlled fluid valve systems.

Conventional valve systems include diverter balls, cylinders, plastic caps with rubber seals and the like to enable the heat exchangers to receive various intake and exhaust flows. While these designs may provide adequate performance for certain applications, they do have some drawbacks. For example, conventional valve systems continue to be problematic due to incompatible manufacturing interfaces, rough handling, assembly issues and errors, contamination, and damage. Such valve systems are extremely detrimental when employed in thermal management systems using newer refrigerants, especially R-744 (carbon dioxide refrigerant) and R-290 (propane refrigerant), because they are prone to leakage and allow the refrigerant to permeate through the valve.

Accordingly, it would be desirable to produce a valve assembly for a fluid system that minimizes leakage and permeation, while optimizing a performance and function of the fluid system.

SUMMARY

In concordance and agreement with the presently described subject matter, a valve assembly for a fluid system that minimizes leakage and permeation, while optimizing a performance and function of the fluid system, has been newly designed.

In one embodiment, a valve assembly for a fluid system, comprises: a housing having a base portion and a stem portion, the base portion including an aperture extending longitudinally therethrough and configured to receive a component of the fluid system having a fluid flowing therethrough, wherein the housing includes at least one passageway in fluid communication with a port provided in the component of the fluid system; a valve core disposed in the stem portion to selectively permit a flow of the fluid of the fluid system therethrough; and a valve disposed in the base portion to selectively permit the flow of the fluid of the fluid system through the at least one passageway.

In another embodiment, a valve assembly for a fluid system, comprises: a housing having a base portion and a stem portion, the base portion including an aperture extending longitudinally therethrough and configured to receive a component of the fluid system having a fluid flowing therethrough, wherein the housing includes at least one passageway in fluid communication with a port provided in the component of the fluid system; a valve core disposed in the stem portion to selectively permit a flow of the fluid of the fluid system therethrough; and a valve disposed in the base portion, wherein the valve is configured to provide hermetic sealing to selectively isolate the valve core from the component of the fluid system.

As aspects of some embodiments, the base portion is generally perpendicular to the stem portion.

As aspects of some embodiments, the base portion is positioned relative to the stem portion at an angle greater than or less than 90 degrees.

As aspects of some embodiments, the base portion is axially aligned with the stem portion.

As aspects of some embodiments, the valve is in threaded engagement with the housing.

As aspects of some embodiments, the valve assembly further comprises a sealing element disposed between the valve and the housing to form a substantially fluid-tight seal therebetween.

As aspects of some embodiments, the valve assembly further comprises a retaining element to militate against removal of the valve from the housing during pressurization.

As aspects of some embodiments, the housing includes a sealing surface adjacent said passageway.

As aspects of some embodiments, the sealing surface of the housing is one of linear conical shaped and curved conical shaped.

As aspects of some embodiments, the sealing surface of the housing has a sealing radius in a range of about 0.0 to about 3.0.

As aspects of some embodiments, the valve includes a seat extending axially from a first end thereof to selectively engage the sealing surface of the housing.

As aspects of some embodiments, the seat has an included angle in a range of about 30 degrees to about 90 degrees.

As aspects of some embodiments, a sealing surface of the seat of the valve has one of a conical and hemispherical shape.

As aspects of some embodiments, a sealing surface of the seat has a coating treatment deposited thereon.

As aspects of some embodiments, the coating treatment is a tin plating.

As aspects of some embodiments, at least one of an end of the valve opposite the seat and the housing are deformable after installation of the valve into the valve assembly to militate against removal of the valve from the housing during pressurization.

As aspects of some embodiments, an angle of a sealing surface of the seat of the valve is substantially the same as an angle of the sealing surface of the housing.

As aspects of some embodiments, an angle of a sealing surface of the seat of the valve is different from an angle of the sealing surface of the housing.

As aspects of some embodiments, a difference between the angle of the sealing surface of the seat of the valve and the angle of the sealing surface of the housing is in a range of about 0.5 degrees to about 30 degrees.

Further areas of applicability will become apparent from the description provided herein.

The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
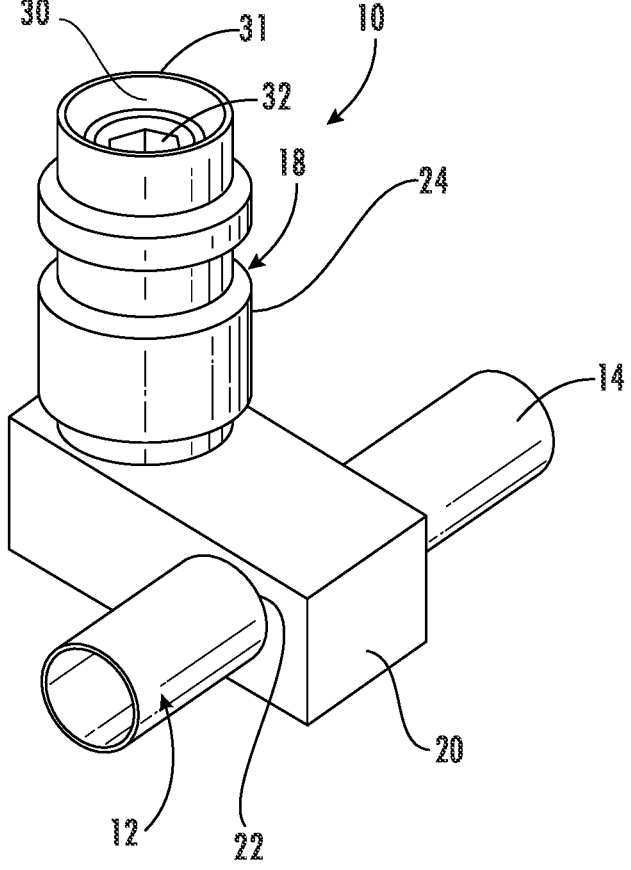
FIG. 1 is a perspective view of a valve assembly in accordance with the present disclosure, illustrated in operational relationship with a fluid system in accordance with the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a valve assembly 10 for a fluid system 12 according to an embodiment of the present disclosure. The valve assembly 10 includes a housing 18 comprising a base portion 20 and a stem portion 24. As illustrated, the base portion 20 has a generally rectangular configuration although any other suitable size, shape, and configuration may be used such as cylindrical. The valve assembly 10, and more particularly the housing 18, may be configured for use in a refrigerant circuit of a thermal management system, and more particularly a mobile air conditioning (MAC) system. It is understood, however, that the valve assembly 10 may be configured for various other applications such as a heating, ventilating, and air conditioning (HVAC) system, a hydrocarbon fuel system, a hydrogen fuel cell, a battery electrolyte system, a battery coolant system, a steering system, a hydraulic brake system, a polyethylene glycol and/or glycol/water mixture, other coolant systems, and the like, for example. The base portion 20 of the housing 18 has an aperture 22 extending longitudinally therethrough to receive a component 14 (e.g., a conduit) of the fluid system 12. The component 14 of the fluid system 12 is configured to receive a flow of a fluid (e.g., a refrigerant, a coolant, steering fluid, glycol, glycol/water mixture, and the like) therethrough. The stem portion 24 extends generally perpendicular to a longitudinal axis of the component 14. The stem portion 24 is generally cylindrical in shape with a generally circular shaped cross-section. It is understood, however, that the stem portion 24 may have an size, shape, and configuration as desired.

Figures 2A, 2B:
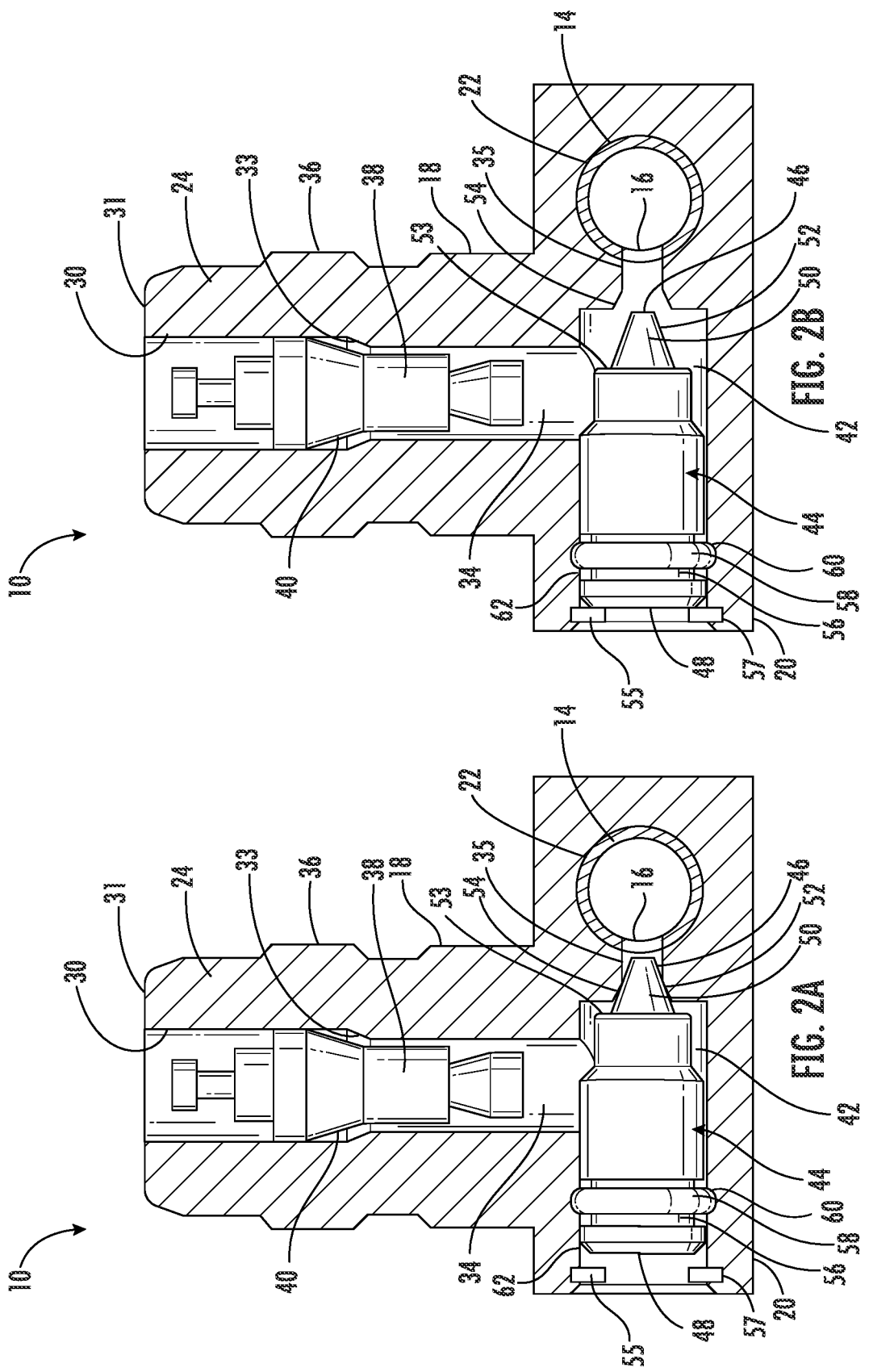
FIG. 2A is a fragmentary elevational view of a valve assembly for a fluid system according to an embodiment of the present disclosure, wherein a valve of the valve assembly is in a closed position.
FIG. 2B is a fragmentary elevational view of the valve assembly of FIG. 2A, wherein the valve of the valve assembly is in an open position.

As illustrated in the embodiment shown in FIGS. 2A and 2B, the stem portion 24 may further include a cavity 30 extending axially therein from a free first end 31 thereof. The cavity 30 has a generally circular cross-sectional shape. The cavity 30 may include a plurality of internal threads adjacent the first end 31 thereof. The cavity 30 also has a sealing seat 33 formed in an intermediate portion thereof. The housing 18 also has a passageway 34 extending axially from the sealing seat 33 of the cavity 30 through the stem portion 24.

Figure 8:
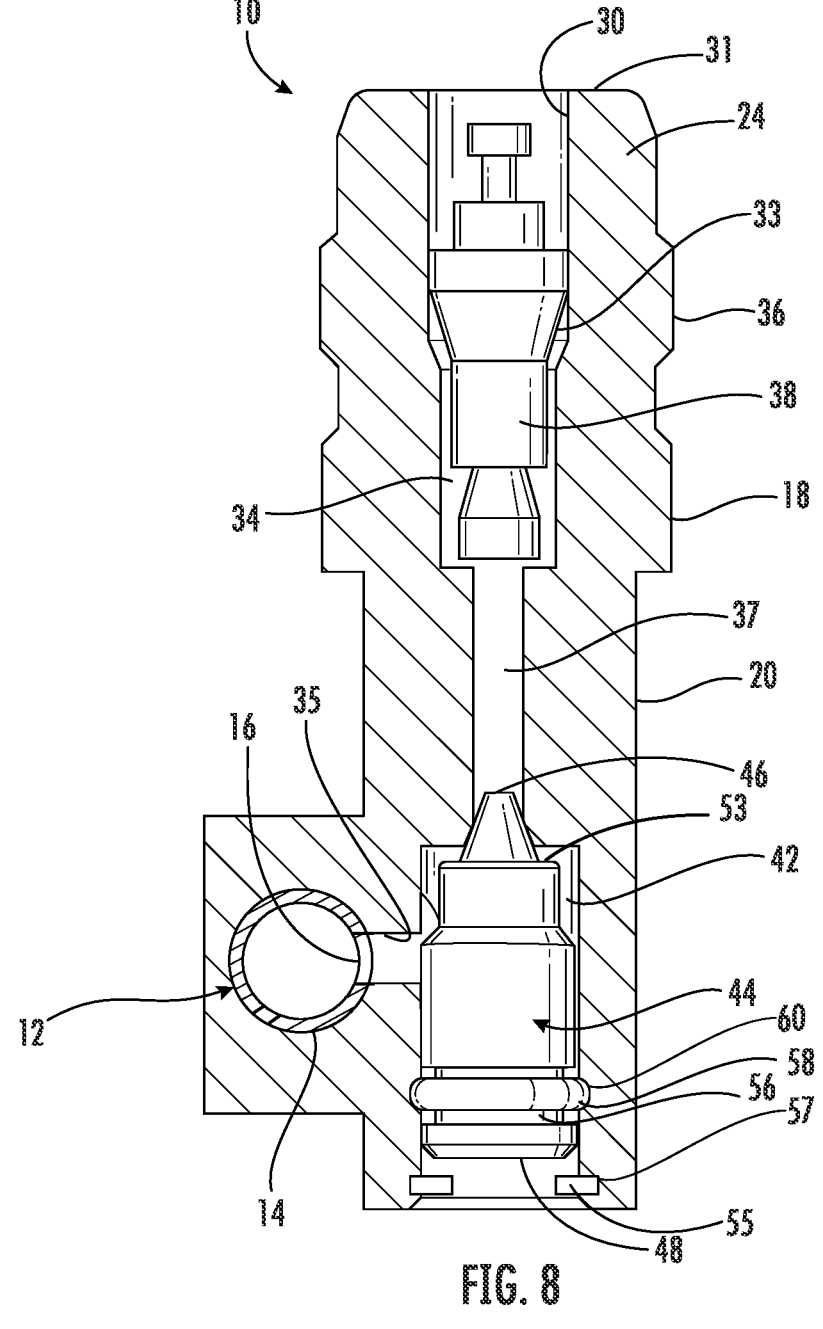
FIG. 8 is a fragmentary elevational view of a valve assembly for a fluid system according to another embodiment of the present disclosure.
Figure 9:
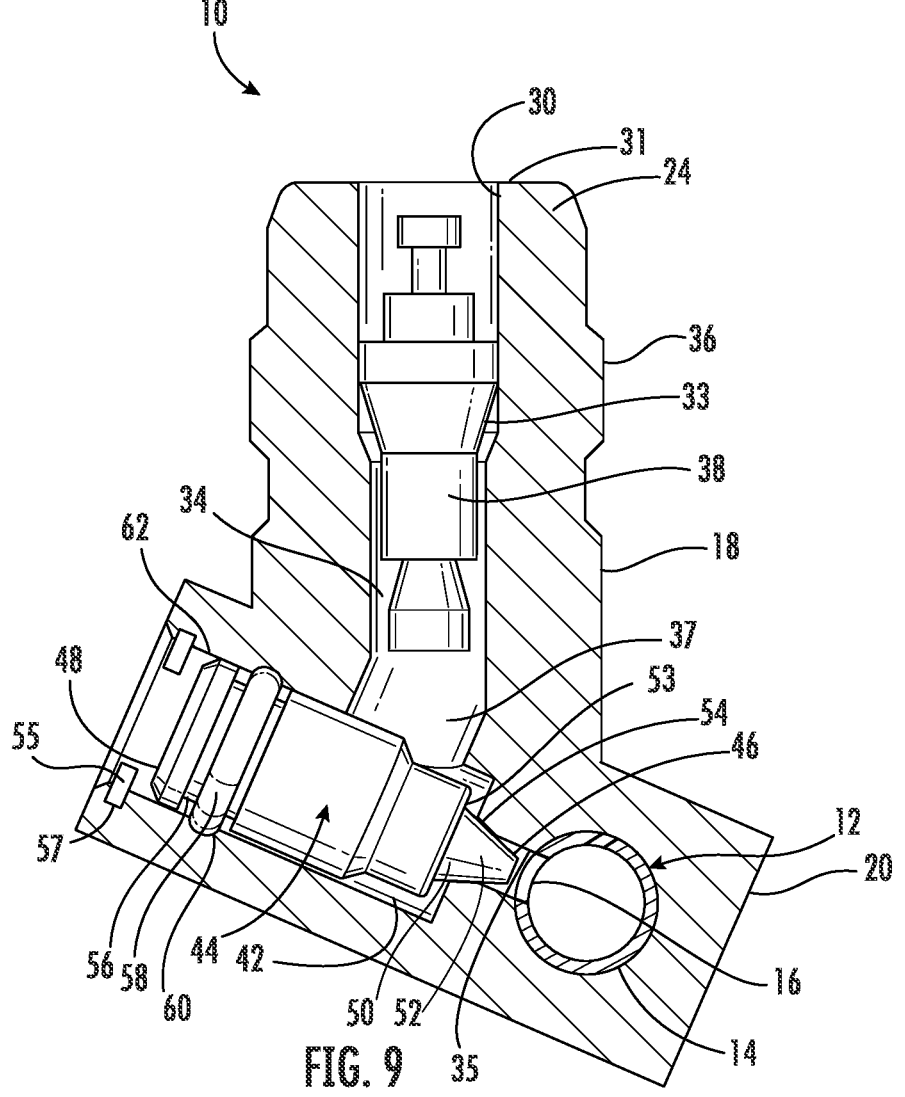
FIG. 9 is a fragmentary elevational view of a valve assembly for a fluid system according to another embodiment of the present disclosure.
Figure 10:
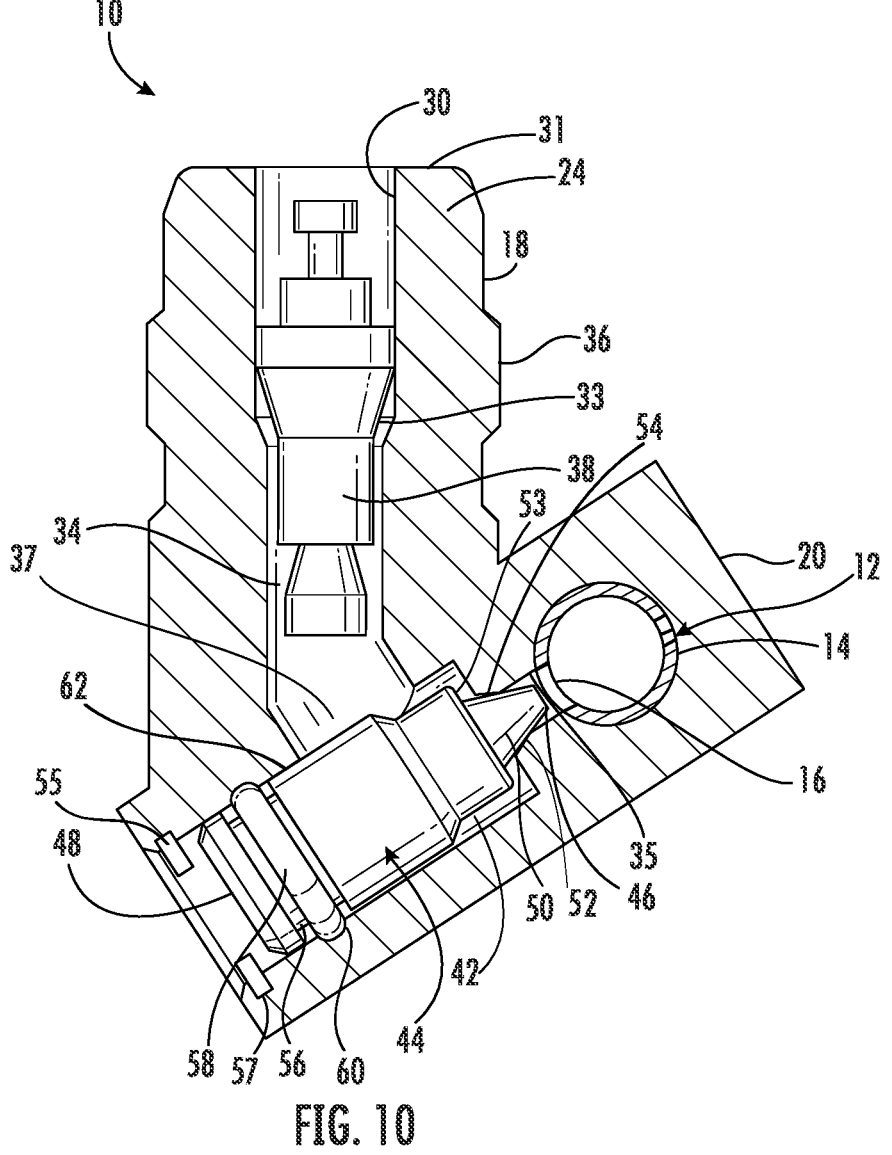
FIG. 10 is a fragmentary elevational view of a valve assembly for a fluid system according to yet another embodiment of the present disclosure.

In the embodiment shown in FIGS. 2A and 2B, the base portion 20 may be formed at about a 90-degree angle relative to the stem portion 24. In other embodiments, however, the base portion 30 may be formed at any suitable angle relative to the stem portion 24. The angle of the base portion 30 relative to the stem portion 24 may vary depending on the application of the fluid system 12 and/or accessibility requirements of the valve assembly 10. Such variation of configuration may occur without adversely affecting performance and function of the valve assembly 10. FIG. 8 shows that in some embodiments, the base portion 20 may be formed in axial alignment with at about a 180-degree angle relative to the stem portion 24. In other embodiments, the base portion 20 may be formed relative to the stem portion 24 at an angle greater than 90-degrees, as shown in FIG. 9. In yet other embodiments, the base portion 20 may be formed relative to the stem portion 24 at an angle less than 90-degrees, as shown in FIG. 10.

The housing 18 may be made of a metal material such as aluminum, for example. Various other materials (e.g., a plastic material or a combination of metal and non-materials) may be used to produce the housing 18 if desired. In some instances, the materials used to produce the housing 18 are dependent upon the application in which the valve assembly 10 is employed. The housing 18 may be a monolithic structure being integral, unitary and one-piece. The housing 18 may be formed by suitable methods such as impact extrusion, bar extrusion, machining, semi-solid shaping, additive forming (e.g., 3-D printing), and the like. It should be appreciated that the base portion 20 of the housing 18 may be secured to the thermal management system component 14 by any suitable means such as brazing. It should also be appreciated that the stem portion 24 of the housing 18 may have an outer surface 36 used for access by a quick connect service tool heads (not shown). It should further be appreciated that the base portion 20 may have a rectangular shape to allow the use of a back-up wrench (not shown) when torquing to a cap.

The valve assembly 10 also includes a valve core 38 removably disposed in the cavity 30 of the housing 18. The valve core 38 may be any valve core such as shown and described in U.S. Pat. No. 6,266,971, incorporated herein it its entirety by reference. The valve core 38 may be generally cylindrical in shape with a generally circular shaped cross-section. The valve core 38 may include a seat 40 at one end extending axially and radially inwardly. The seat 40 may be generally cone, conical, or frustoconical shaped. The seat 40 may be configured to sealingly engage the sealing seat 33 in the cavity 30 of the housing 18 to achieve high sealing pressure from a single line contact. The valve core 38 may further include a plurality of external threads (not depicted) at the other end thereof to threadably engage the internal threads of the cavity 30 to open and close the valve assembly 10. The valve core 38 may include a cavity 32 (shown in FIG. 1) extending axially inwardly from an end with the external threads. The cavity 32 of the valve core 38 may be a hexagonal shaped cross-section to enable an assembly or service tool (not shown) to engage the valve core 38 and set the valve core 38 at different positions. The valve core 38 may also include a first passageway (not depicted) extending axially from a bottom of the cavity to a point adjacent the seat 40. The valve core 38 also includes a second passageway (not depicted) extending radially therethrough at an end of the first passageway adjacent the seat 40. The valve core 38 may be made of a metal material such as aluminum, brass, stainless steel, etc. The valve core 38 shown is a monolithic structure being integral, unitary and one piece. It should be appreciated that the first passageway and second passageway are in fluid communication with each other to provide a vent path for evacuation, charging and diagnostics of the thermal management system 12.

It is understood that the valve core 38 may be any suitable type of valve core 38 as configured to allow the fluid to ingress and egress the fluid system 12. For example, the valve core 38 may also be a spring-loaded poppet. The type of valve core 38 may be determined upon the application in which the valve assembly 10 is used.

As illustrated, the base portion 20 includes a cavity 42 extending axially therein. The cavity 42 has a generally circular cross-sectional shape. The base portion 20 may further include a passageway 35 formed therein. The passageway 35 and/or the cavity 42 of the base portion 20 fluidly connects the passageway 34 of the stem portion 24 to a port 16 formed in the component 14 of the fluid system 12 to permit a flow of the fluid of the fluid system 12 therethrough. It should also be appreciated that the passageways 34, 35 and the port 16 may be in fluid communication with each other to provide a vent path for evacuation, charging and diagnostics of the fluid system 12.

The valve assembly 10 also includes a valve 44 removably disposed in the cavity 42 of the housing 18. The valve 44 is configured to provide a hermetic seal to isolate the valve core 38 from the component 14 of the fluid system 12, and militate against the flow of the fluid from the fluid system 12 through the valve assembly 10. The valve 44 may have generally cylindrical shape with a generally circular shaped cross-section. The valve 44 may include a first end 46 and an opposite second end 48. A seat 50 having a sealing surface 52 terminating at an abutment surface 53 may be formed at the first end 46. The seat 50 may extend axially outwardly from the abutment surface 53 while also extending radially inwardly. The seat 50 may be generally cone, conical, or frustoconical shaped. A sealing surface 52 of the seat 50 may be configured to sealing engage a sealing surface 54 of the housing 18. In certain instances, the sealing engagement of the sealing surfaces 52, 54 achieves a high sealing pressure from a single line contact. The valve 44 may be made of a metal material such as aluminum, brass, stainless steel, etc. In some embodiments, however, the valve 44 may also include a coating treatment deposited on at least a portion thereof. For example, an outer surface of the valve 44 may be include a soft metal plating such as a tin plating. In particular embodiments, at least one of the sealing surface 52, 54 may be enhanced by having the coating treatment (e.g., a matte tin plating) deposited thereon.

In preferred embodiments, the sealing surface 52 of the seat 50 has an included angle in a range of about 30 degrees to about 90 degrees, and more preferably, an included angle of about 60 degrees. The abutment surface 53 may perform as a wear stop to prevent over-travel and damage to the valve 44, oftentimes caused by over-torque or excess repeat assembly. In certain embodiments, the sealing surface 54 of the housing 18 is generally tapered or conical shaped. In some preferred embodiments, the sealing surface 54 of the housing 18 has a generally curved conical shape with a sealing radius in a range of about 0.0 to about 3.0, and more preferably about 1.0. In other embodiments, the sealing surface 54 of the housing 18 may be generally linear conical shaped.

Figure 4:
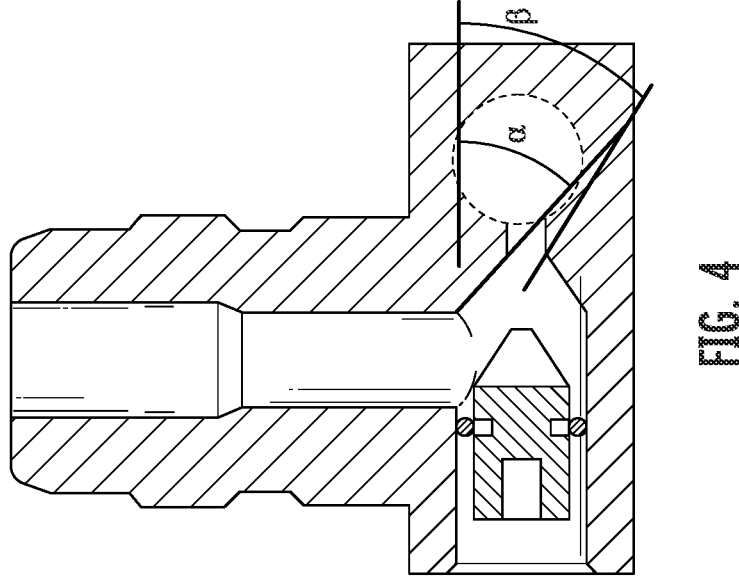
FIG. 4 is a schematic elevational view of a valve assembly of the present disclosure, illustrating a comparison of the sealing surface angle of the valve to the sealing surface angle of the housing in accordance with other embodiments of the present disclosure.
Figure 3:
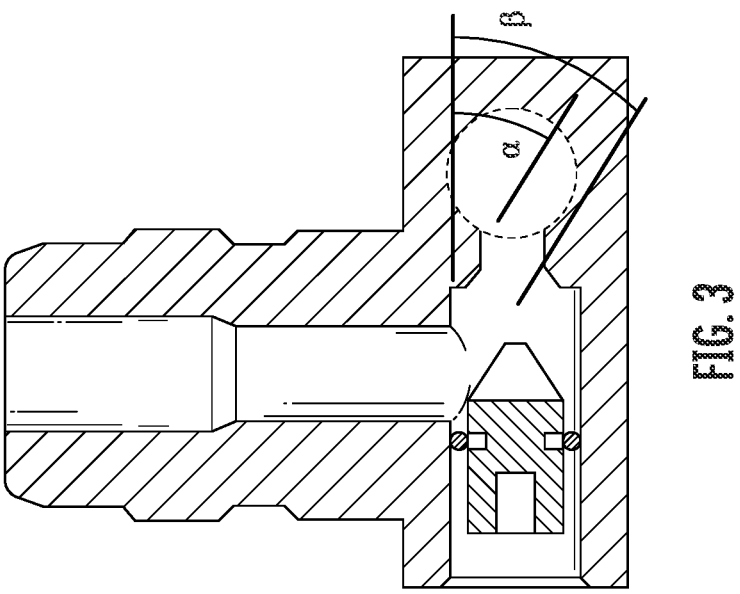
FIG. 3 is a schematic elevational view a valve assembly of the present disclosure, illustrating a comparison of a sealing surface angle of the valve to a sealing surface angle of the housing in accordance with some embodiments of the present disclosure.

As best seen in FIGS. 3 and 4, an angle of the sealing surface 54 of the housing 18 may be substantially the same or vary when compared to an angle of the sealing surface 52 of the seat 50. In a non-limiting example shown in FIG. 3, an angle $\alpha$ of the sealing surface 54 of the housing 18 relative to horizontal is substantially the same as an angle $\beta$ of the sealing surface 52 of the seat 50 relative to horizontal. As another exemplary embodiment shown in FIG. 4, the angle $\alpha$ of the sealing surface 54 of the housing 18 relative to horizontal is different from the angle $\beta$ of the sealing surface 52 of the seat 50 relative to horizontal. In some embodiments, the angle $\alpha$ and the angle $\beta$ may diverge by as much as 30 degrees. In some circumstances, a difference between the angle $\alpha$ and the angle $\beta$ may be in a range of about 0.5 degrees to about 30 degrees in either a clockwise direction of a counter-clockwise direction.

The valve 44 may also include a recessed feature/cavity (not depicted) extending axially inwardly from the second end 48 to enable an assembly or service tool (not depicted) to engage the valve 44 and set the valve 44 at different positions. It is understood that the recessed feature/cavity may have any size, shape, and configuration as desired such as a generally hexagonal shape to receive a torque wrench, for example.

Referring back to FIGS. 2A and 2B, a retaining element 55 (e.g., a clip ring, circlip, a threaded or staked device) may be used in some embodiments to militate against undesired removal of the valve 44 from the cavity 42. It is also understood that the retaining element 55 may be configured and/or connected to other components of the fluid system 12 to warn against accidental disassembly of the valve 44 from the housing 18 while subjected to pressure of the fluid system 12 when the valve 44 is in the open position. As illustrated, the retaining element 55 may be received in a receptacle 57 (e.g., an annular groove) formed in the cavity 42. In other embodiments, the housing 18 and/or the second end 48 of the valve 44 may be configured to be deformed after installation of the valve 44 to prevent removal from the valve assembly 10.

The valve 44 is configured to be selectively positionable between a closed position as shown in FIG. 2A and an open position as shown in in FIG. 2B. When in the closed position, at least a portion of the seat 50 is received in the port 35 formed in the housing 18 such that the surface 52 of the seat 50 sealing engages the sealing surface 54 of the housing 18 to form a substantially fluid-tight therebetween and militate against a flow of the fluid from the fluid system 12 through the valve assembly 10. On the contrary, when the valve 44 is in the open position, as shown in FIG. 2B, the sealing surfaces 52, 54 are spaced apart to permit the flow of fluid from the fluid system 12 into the valve assembly 10 and through/past the valve core 38.

Figure 5:
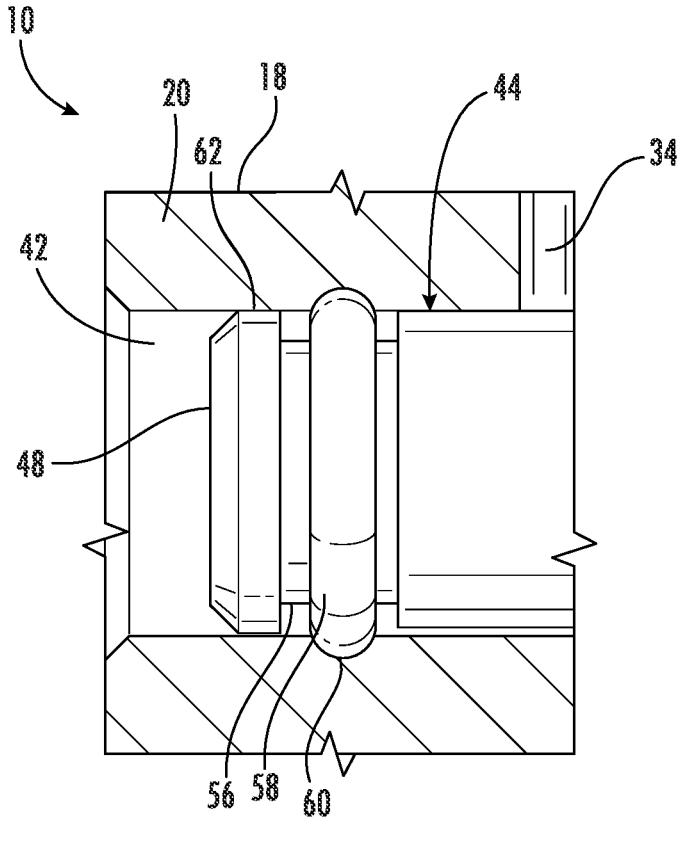
FIG. 5 is an enlarged fragmentary elevational view of a portion of the valve assembly of FIGS. 2A and 2B, illustrating a sealing element and a retaining element provided for the valve.

As best seen in FIG. 5, the second end 48 of the valve 44 may include at least one retention feature 56 (e.g., an annular groove) configured to receive a sealing element 58 (e.g. O-rings, gaskets, elastomeric seals, and the like) therein. The sealing element 58 may be configured to sealing engage a retention feature 60 (e.g., an annular groove) formed in the base portion 20 of the housing 18 to form a substantially fluid-tight seal therebetween and militate against leakage of the fluid therefrom. In embodiments without the retention feature 60, the sealing element 58 may be configured to sealingly engage an inner surface 62 of the cavity 42 to form a substantially fluid-tight seal therebetween. It is understood that various other sealing methods may be employed if desired.

It is further understood that more or less sealing elements 58 than shown may be employed as desired. In certain embodiments, the valve 44 may be produced from a metal material such as aluminum, brass, stainless steel, etc. The valve 44 may be a monolithic structure being integral, unitary and one piece.

In operation of certain embodiments of the valve assembly 10, the component 14 is extended through the aperture 22 of the base portion 20 of the housing 18 and the passageway 35 is aligned with the port 16. The housing 18 is secured to the component 14. The valve core 38 is disposed in the cavity 30 and the seat 40 engages the sealing seat 33. At the time of charging or performing other internal accessing services, the housing 18 is connected to a quick connect service coupling (not shown). The valve core 38 is opened by a hex key (not shown) in a service tool (not shown) that can be maneuvered from an open side of the service tool. The hex key is disposed in the cavity of the valve core 38 and the valve core 38 is opened by rotating the valve core 38 such that the seat 40 disengages the sealing seat 33. The hex key is removed from the cavity and the fluid flows through the valve core 38, the passageway 34, the cavity 42, at least one of the passageways 35, 37, and the port 16 to the component 14 to charge the fluid system 12. Once charged, the hex key is disposed in the cavity of the valve core 38 is rotated to engage the seat 40 with the sealing seat 33. The valve core 38 is wrenched to ensure a primary seal and the valve 44 is closed to provide a secondary seal.

Further, the valve 44 may be engaged to provide hermetic sealing to selectively isolate the valve core 38 from the component 14 of the fluid system 12. The valve 44 is moved so that the sealing surface 52 of the seat 50 sealingly engages the sealing surface 54 of the housing 18. As described hereinabove, an assembly or service tool may be inserted in the recessed feature/cavity formed in the second end 48 of the valve 44 to cause axial movement of the valve 44 in a first direction towards the sealing surface 54 of the housing 18 until the valve 44 is in the closed position (as shown in FIG. 2A) and sealing engagement is achieved. Once the valve 44 is in the closed position and sealing engagement is reached, the assembly or service tool may be removed from the valve 44. In the closed position, the valve 44 militates against the flow of the fluid from fluid system 12 through the valve assembly 10, and more particularly at least one of the passageways 34, 35, 37, the cavity 42, and/or the valve core 38.

When hermetic sealing is not desired, the assembly or service tool may be inserted in the recessed feature/cavity formed in the second end 48 of the valve 44 to cause axial movement of the valve 44 in an opposite second direction away from the sealing surface 54 of the housing 18 until the valve 44 is in the open position (as shown in FIG. 2B) and the sealing surface 52 of the seat 50, and thereby the valve 44, is disengaged. Once the valve 44 is in the open position, the assembly or service tool may be removed from the valve 44. In the open position, the valve 44 permits the flow of the fluid from fluid system 12 through the valve assembly 10, and more particularly through at least one of the passageways 34, 35, 37, the cavity 42, and/or the valve core 38.

Figure 6A:
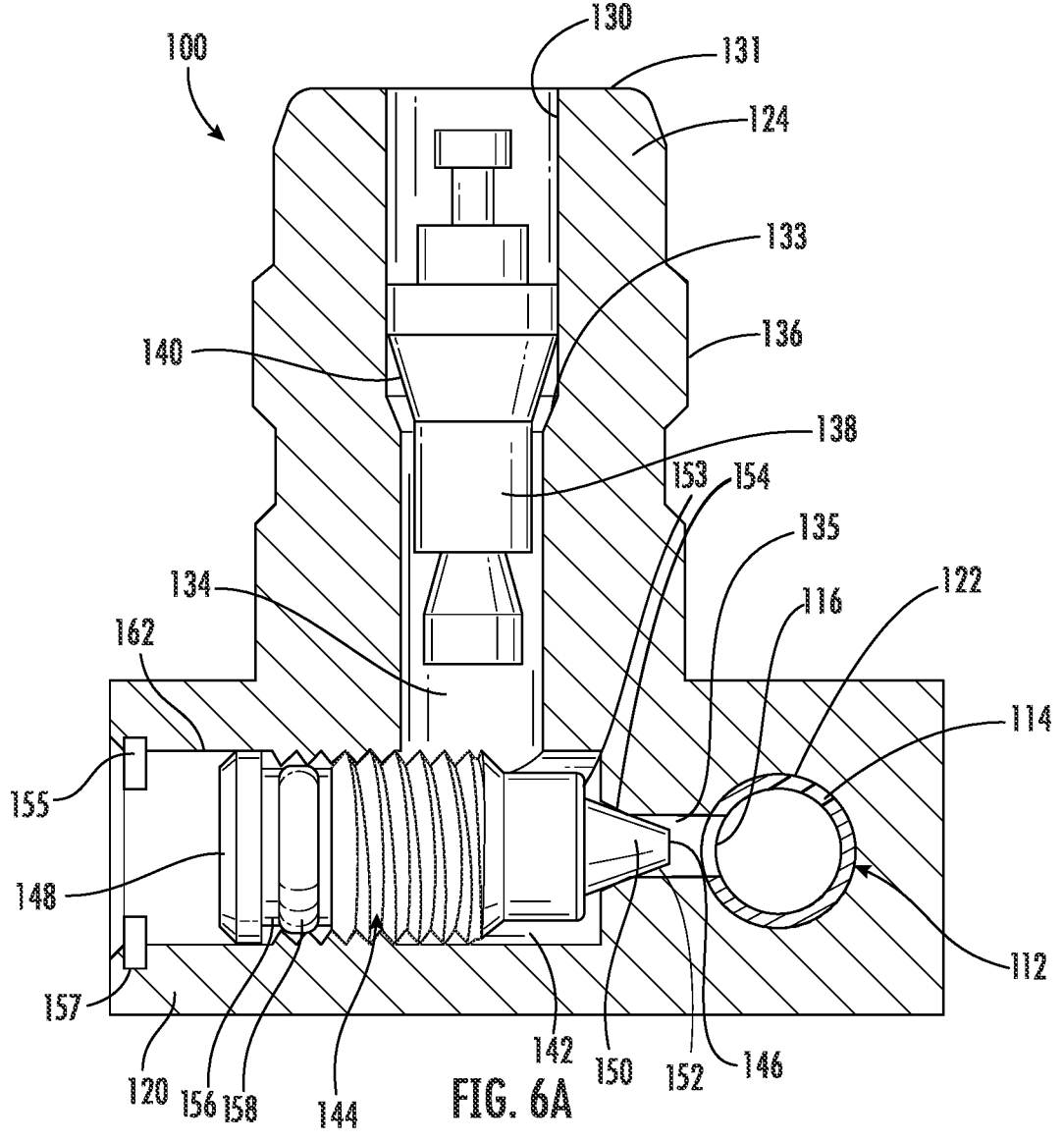
FIG. 6A is a fragmentary elevational view of a valve assembly for a fluid system according to another embodiment of the present disclosure, wherein a valve of the valve assembly is in a closed position and in threaded engagement with a housing of the valve assembly.
Figure 6B:
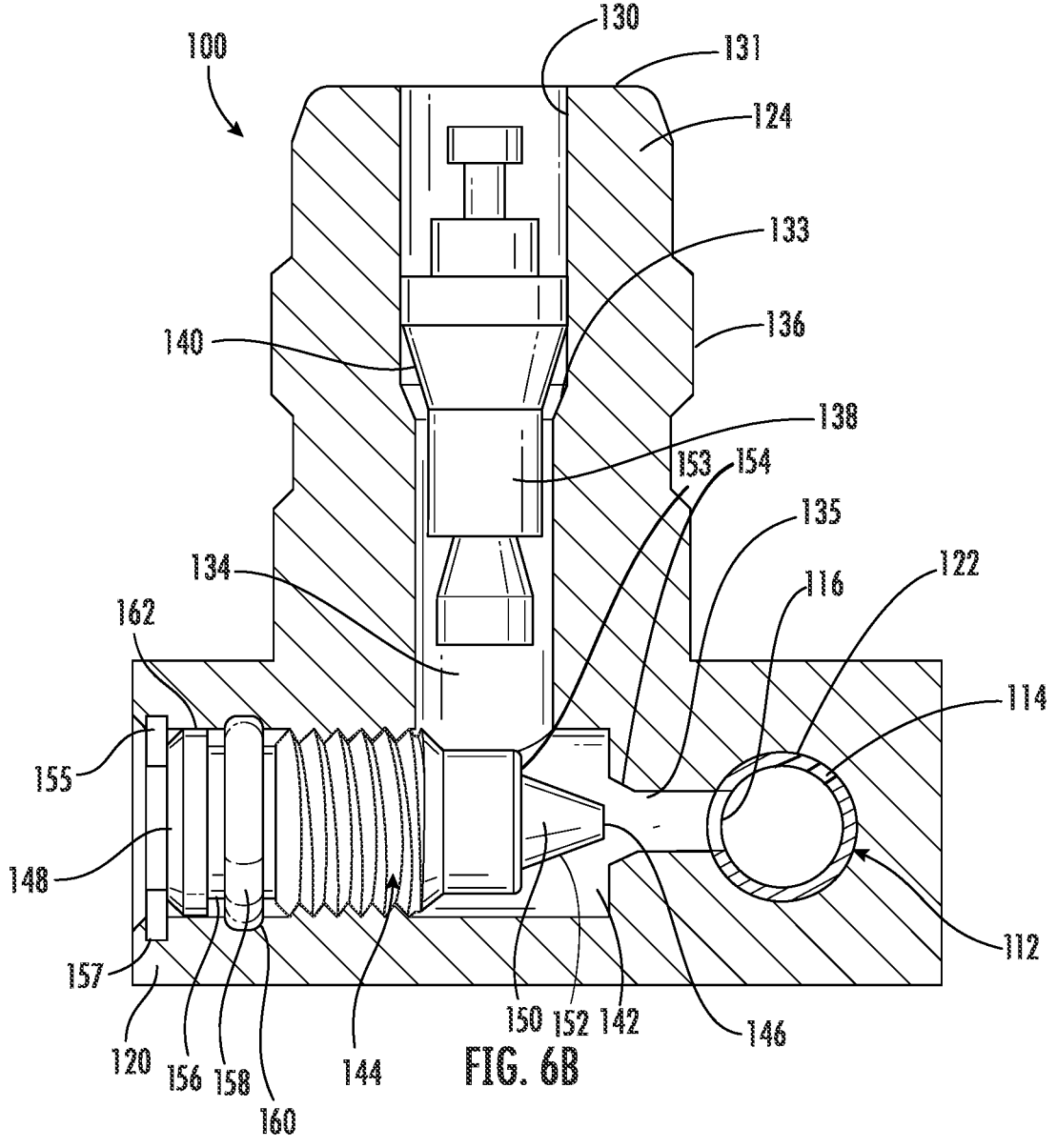
FIG. 6B is a fragmentary elevational view of the valve assembly of FIG. 6A, wherein the valve of the valve assembly is in an open position.

Referring to FIGS. 6A and 6B, another embodiment 100, according to the present invention, of the valve assembly 10 is shown. Like parts of the valve assembly 10 have like reference numerals increased by one hundred (100). In this embodiment, the valve 144 of the valve assembly 100 is in threaded engagement with the housing 18 to selectively position the valve 144 between the open and closed positions. In particular, an outer surface of the valve 144 may include a plurality of external threads formed thereon, which are configured to cooperated with a plurality of internal threads formed on the inner surface 162 of the cavity 142. The operation of the valve assembly 100 is similar to the valve assembly 10 and is not repeated herein for simplicity purposes.

Figure 7A:
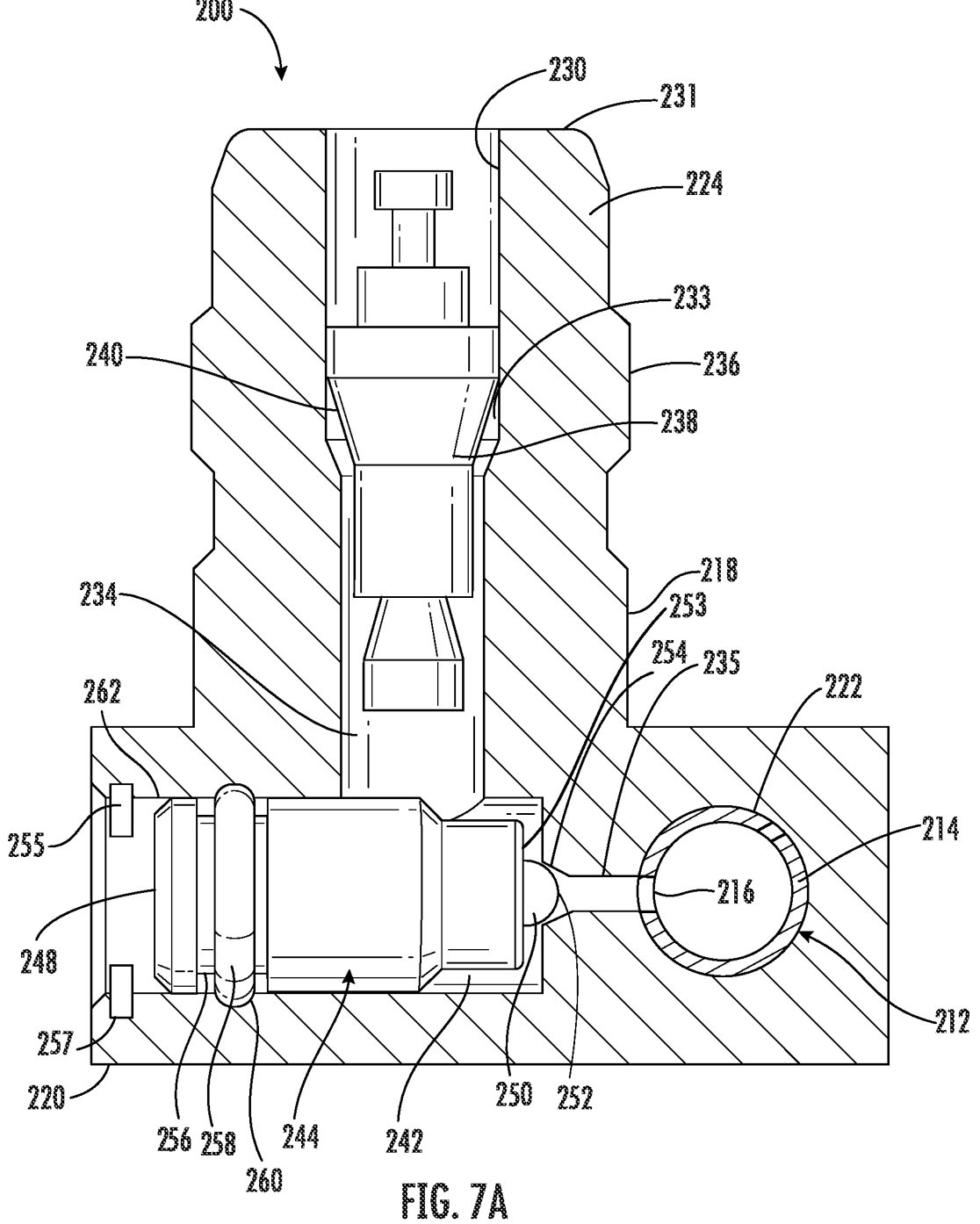
FIG. 7A is a fragmentary elevational view of a valve assembly for a fluid system according to another embodiment of the present disclosure, wherein a valve of the valve assembly is in a closed position.
Figure 7B:
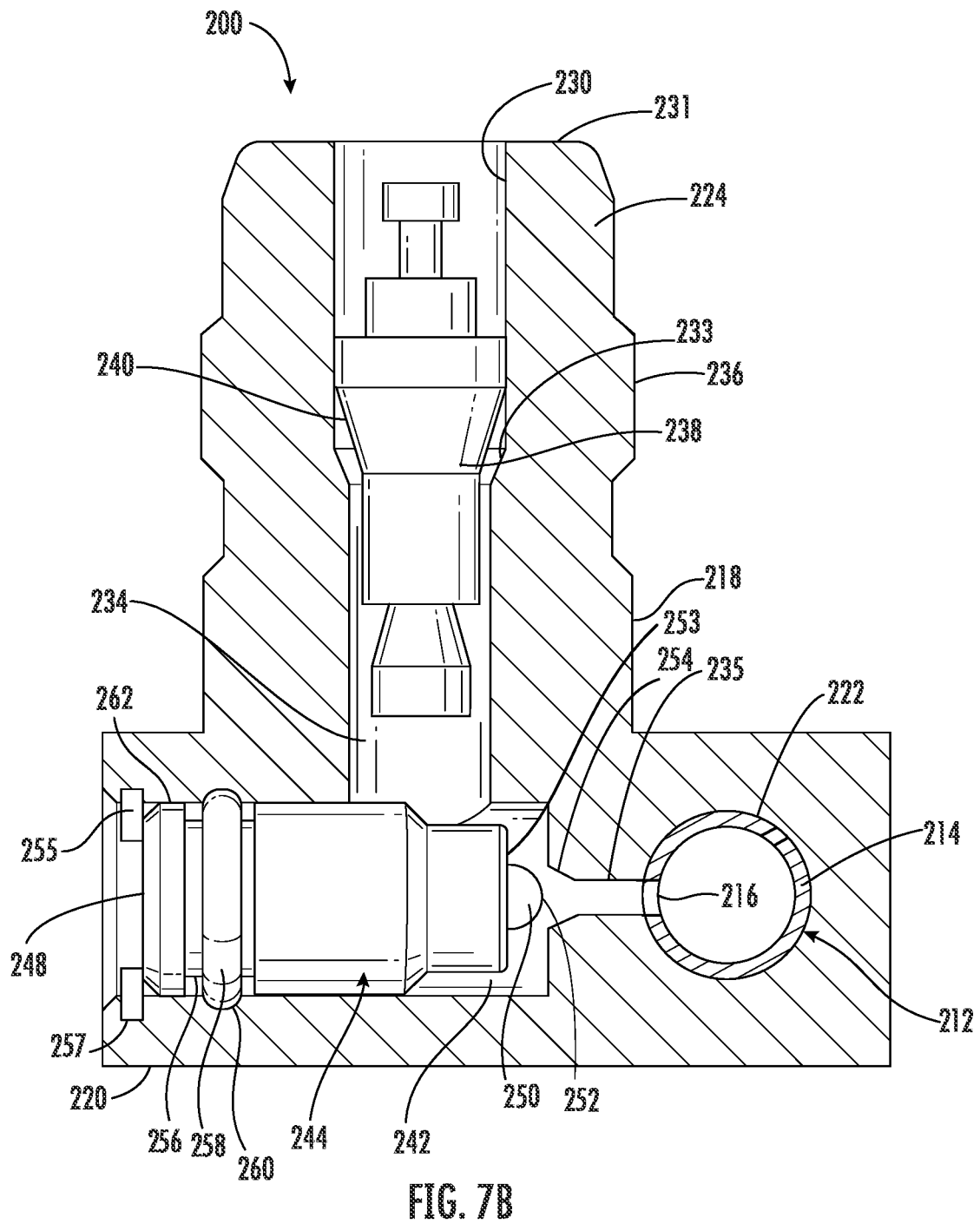
FIG. 7B is a fragmentary elevational view of the valve assembly of FIG. 7A, wherein the valve of the valve assembly is in an open position.

Referring to FIGS. 7A and 7B, yet another embodiment 200, according to the present invention, of the valve assembly 10 is shown. Like parts of the valve assembly 10 have like reference numerals increased by two hundred (200). In this embodiment, the valve assembly 200 includes a valve 244 having a hemispherical or radially shaped sealing surface 252 of the seat 250. In some instances, the sealing surface 254 of the housing 218 may be a linear conical shape or a curved conical shape. The operation of the valve assembly 200 is similar to the valve assembly 10 and is not repeated herein for simplicity purposes.

As described hereinabove, FIG. 8 shows that in some embodiments, the base portion 20 may be formed in axial alignment with at about a 180-degree angle relative to the stem portion 24. FIG. 9 show that in other embodiments, the base portion 20 may be formed relative to the stem portion 24 at an angle greater than 90-degrees. FIG. 10 shows in yet other embodiments, the base portion 20 may be formed relative to the stem portion 24 at an angle less than 90-degrees. Additionally, in some embodiments such as those shown in FIGS. 8-10, the base portion 20 may further include a passageway 37 to fluidly connect the passageways 34, 35. Further, in the embodiment shown in FIG. 8, the valve 44 is configured to selectively permit the flow of fluid through the passageway 37 instead of the passageway 35 as depicted in the other embodiments.

It should be appreciated that the valve assembly 10, 100, 200 and the fluid system 12, 112, 212 may include more or less components, valves, conduits, and other features and aspects than illustrated and described in FIGS. 1-10 without departing from the spirit and scope of the present disclosure.

Advantageously, the valve assembly 10 provides ease of use and understanding by customer and service technicians. The valve assembly 10 is also environmentally friendly by reducing contamination by eliminating leakage and permeation of the fluid (e.g., refrigerant) therefrom. Efficient packaging of the valve assembly 10 is achieved since it is more compact and has fewer components than conventional valve assemblies. The valve assembly 10 also has robust sealing and durability to withstand excessive and/or aggressive material handling and manufacturing (i.e., over-torque) yet achieve optimal performance and function. In some embodiments, the valve assembly 10 may also include an optional retaining element 55 to prevent removal while under pressure for safety purposes.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A valve assembly for a fluid system, comprising:
a housing having a base portion and a stem portion, the base portion including an aperture extending longitudinally therethrough and configured to receive a component of the fluid system having a fluid flowing therethrough, wherein the housing includes at least one passageway in fluid communication with a port provided in the component of the fluid system;
a valve core disposed in the stem portion to selectively permit a flow of the fluid of the fluid system therethrough; and
a valve disposed in the base portion to selectively permit the flow of the fluid of the fluid system through the at least one passageway,
wherein, when the valve militates against the flow of the fluid from the fluid system through the valve assembly, the valve core is in a closed position to provide a double seal,
wherein, when the valve permits the flow of the fluid from the fluid system into the valve assembly, the valve core is in an open position, and
wherein the valve is accessible from outside the housing regardless of the position of the valve core.

2. The valve assembly of claim 1, wherein the base portion is generally perpendicular to the stem portion.

3. The valve assembly of claim 1, wherein the base portion is positioned relative to the stem portion at an angle greater than or less than 90 degrees.

4. The valve assembly of claim 1, wherein the base portion is axially aligned with the stem portion.

5. The valve assembly of claim 1, wherein the valve is in threaded engagement with the housing.

6. The valve assembly of claim 1, further comprising a sealing element disposed between the valve and the housing to form a substantially fluid-tight seal therebetween.

7. The valve assembly of claim 1, further comprising a retaining element to militate against removal of the valve from the housing during pressurization.

8. The valve assembly of claim 1, wherein the housing includes a sealing surface adjacent said passageway.

9. The valve assembly of claim 8, wherein the sealing surface of the housing is one of linear conical shaped and curved conical shaped.

10. The valve assembly of claim 8, wherein the sealing surface of the housing has a sealing radius in a range of about 0.0 to about 3.0.

11. The valve assembly of claim 8, wherein the valve includes a seat extending axially from a first end thereof to selectively engage the sealing surface of the housing.

12. The valve assembly of claim 11, wherein the seat has an included angle in a range of about 30 degrees to about 90 degrees.

13. The valve assembly of claim 11, wherein a sealing surface of the seat of the valve has one of a conical, frustoconical, and hemispherical shape.

14. The valve assembly of claim 11, wherein a sealing surface of the seat has a coating treatment deposited thereon.

15. The valve assembly of claim 14, wherein the coating treatment is a tin plating.

16. The valve assembly of claim 11, wherein at least one of an end of the valve opposite the seat and the housing are deformable after installation of the valve into the valve assembly to militate against removal of the valve from the housing during pressurization.

17. The valve assembly of claim 11, wherein an angle of a sealing surface of the seat of the valve is substantially the same as an angle of the sealing surface of the housing.

18. The valve assembly of claim 11, wherein an angle of a sealing surface of the seat of the valve is different from an angle of the sealing surface of the housing.

19. The valve assembly of claim 11, wherein a difference between the angle of the sealing surface of the seat of the valve and the angle of the sealing surface of the housing is in a range of about 0.5 degrees to about 30 degrees.

20. A valve assembly for a fluid system, comprising:
a housing having a base portion and a stem portion, the base portion including an aperture extending longitudinally therethrough and configured to receive a component of the fluid system having a fluid flowing therethrough, wherein the housing includes at least one passageway in fluid communication with a port provided in the component of the fluid system;
a valve core disposed in the stem portion to selectively permit a flow of the fluid of the fluid system therethrough; and
a valve disposed in the base portion, wherein the valve is configured to provide hermetic sealing to selectively isolate the valve core from the component of the fluid system,
wherein, when the valve militates against the flow of the fluid from the fluid system through the valve assembly, the valve core is in a closed position to provide a double seal,
wherein, when the valve permits the flow of the fluid from the fluid system into the valve assembly, the valve core is in an open position, and
wherein the valve is accessible from outside the housing regardless of the position of the valve core.

* * * * *